3,044,744
DRAG REDUCING METHOD AND ARRANGEMENT FOR HYDRAULIC TURBINE RUNNERS
Martin John Berlyn, Montreal, Quebec, Canada, assignor to Dominion Engineering Works Limited, Lachine, Quebec, Canada
Filed Aug. 17, 1959, Ser. No. 834,357
Claims priority, application Canada May 22, 1959
2 Claims. (Cl. 253—26)

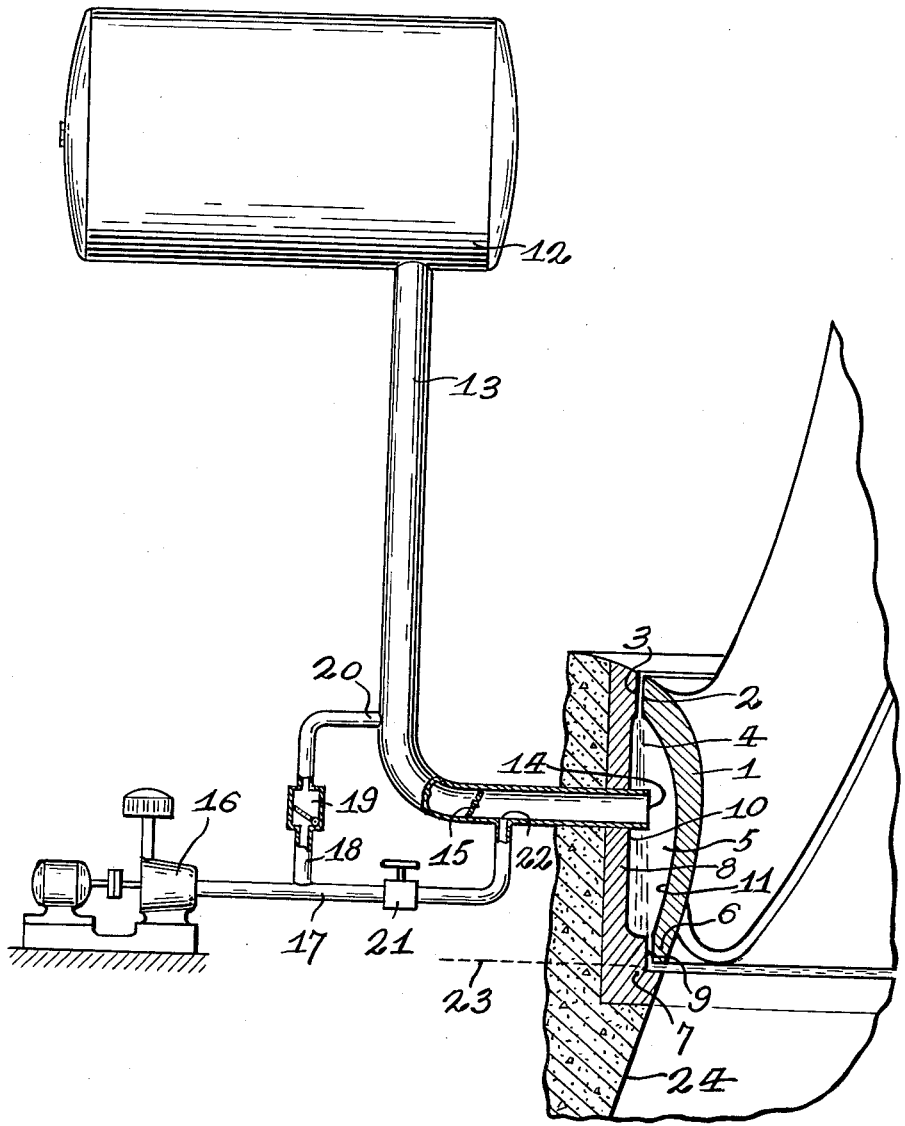

This invention relates to hydraulic turbines used primarily for driving an electric generator for the production of electric power.

The driving element or runner consists of a series of curved "blades" held together at their upper, or inner, ends by a disc or "crown," and at their lower, or outer, ends by a ring or "band." The reaction forces due to changing the direction of flow of the water as it passes over the blades causes the runner to rotate. It is desirable to reduce to a minimum the frictional resistances to rotation of the runner. In the case of the Francis-type runner, the major component of frictional resistance to rotation is the "fluid drag" on the band. Part of this fluid drag is developed at the band seal. The remainder is due to shearing and turbulence of water in the annular space between the external periphery of the band and the bore of the stationary throat ring.

An attempt to control drag has been to inject air into the annular space referred to so that it will mix with the water already in this space and form an emulsion. However, this expedient has not proven effective enough in reducing the drag.

The applicant has now overcome the problem, as will be explained, by eliminating contact of water with the external periphery of the band, except at the band seal.

*Applicant's Development*

In accordance with the present invention, water is initially expelled or purged from the annular space between the external periphery of the runner band and the bore of the stationary throat ring; subsequently, this annular space is kept dry by maintaining air in it at a pressure sufficiently high to expel continuously the small amount of water entering as a consequence of unavoidable leakage at the band seal. The level of the surface of the water in the annular space is automatically maintained near to the lowest extremity of the band, independently of changes in the operating regime of the turbine, whereby the maximum possible area of the external periphery of the band is kept dry, thus reducing drag on the runner substantially to the minimum possible.

To accomplish this, the turbine is provided with an air duct which communicates with the annular space; it is also provided with outlet means from the annular space, located at a level near to the lowest extremity of the band. Means are provided for suddenly admitting air at a high rate of flow to the annular space. The effect of this admission of air at a high rate of flow is to purge the annular space of water. In order to achieve this purge, the high rate of air flow is only required for a relatively short period of time. Following the purge, air at a relatively low rate of flow is supplied continuously by way of the air duct. The flow rate of this continuous supply of air is controlled by throttling means; this air is at a pressure sufficient to maintain the surface of the water in the annular space down to the level of the outlet.

The level-controlling action is inherently stable since the incoming continuously supplied air cannot escape from the annular space except by forcing the surface of the water below the level of the outlet. When the surface of the water has been depressed more than a very small distance below the level of the outlet, air escapes from the annular space more rapidly than it can pass the throttling means; the resultant drop of air pressure in the annular space permits the surface of the water to rise to the level of the outlet, thus, again, preventing escape of air from the annular space.

In steady state operation of the turbine, the water level in the annular space stabilizes. This is to say that a substantially constant area of opening is established for air from the outlet at the flow rate at which it enters the annular space by way of the throttling means and the duct.

The invention will now be described in more detail by reference to the accompanying drawing which shows a preferred turbine construction in accordance with it.

The figure shows a vertical radial section through the runner band and stationary throat ring of a typical Francis turbine. It shows schematically the air supply and the air and water outlet means.

Runner band 1 is provided with an upper portion 2 at its upper extremity which cooperates with the upper portion 3 of the throat ring 8 to constitute a band seal to maintain leakage 4 of water into annular space 5 to a minimum. The lower extremity 6 of runner band 1 is dimensionally related to lower end 7 of throat ring 8 so that the flow capacity of the gap 9 between 6 and 7 is greater than the flow capacity past the seal elements 2 and 3.

Between the stationary element 3 and the lower end 7 of throat ring 8 is the bore 10 of throat ring 8 which forms, with the external periphery 11 of runner band 1, the annular space 5 to which the gap between the upper portion 2 of the runner band 1 and the upper portion 3 of the throat ring 8 constitutes an entrance and the gap 9 constitutes an outlet.

Air storage receiver 12 is connected by duct 13 to annular space 5. The discharge end 14 of duct 13 is preferably located at a radial distance from the axis of runner band 1 which is less than the radius of band seal 2. Duct 13 is provided with valve 15 which is preferably of the quick-acting type.

Air compressor 16 discharges compressed air through duct 17 which is provided with a branch duct 18. Branch duct 18 is connected with duct 13 by way of a non-return check valve 19. The point of junction 20 of branch duct 18 with duct 13 is located on the side of valve 15 remote from discharge end 14 of duct 13. Duct 17 is connected with duct 13 by way of throttling means 21. The point of junction 22 of duct 17 with duct 13 is on the side of valve 15 adjacent the discharge end 14 of duct 13.

The lower end 7 of throat ring 8 forms the upper extremity of the turbine draft tube 24.

The operation of the preferred construction shown is as follows:

When the turbine has been put into operation in the normal manner, annular space 5 is full of water. Valve 15 is opened quickly and air from receiver 12 is discharged at a high rate through the duct 13 into annular space 5. Whereas introduction of air into annular space 5 at a relatively low rate results in mixing of air bubbles and water into a froth, introduction of air at a relatively high rate expels the water cleanly from, and purges, annular space 5. Since, under normal operation of the turbine, the water pressure immediately above cooperating seal elements 2 and 3 is at a higher pressure than water in gap 9, introduction of air under pressure from receiver 12 by way of duct 13, valve 15 and discharge end 14 of duct 13 into annular space 5 forces the water from annular space 5 out through gap 9 into draft tube 24. Following the purge of annular space 5, valve 15 is quickly closed. Air is now bled into annular space 5 at a relatively low rate of flow through duct 17, throttling means 21 and discharge end 14 of duct 13.

The level of the water in annular space 5 is now approximately at the level indicated generally by 23.

If the water level should rise until it has just closed gap 9, the incoming compressed air can find no outlet from annular space 5 since water leakage 4 passing between cooperating seal elements 2 and 3 enters annular space 5 due to pressure higher than the water pressure in the region of gap 9. Continued introduction of compressed air raises the pressure in annular space 5 until it is sufficient to drive the surface of the water in annular space 5 to a point slightly below the lower end of gap 9, this water which is driven down through gap 9 includes water leakage 4. If the area for air flow created by dropping of water level 23 is greater than the area of throttling means 21, the air pressure in annular space 5 will decrease to the point where water level 23 rises slightly and seals off gap 9 again. Thus it can be seen that, having first purged annular space 5 of water by means of a sudden rush of air from receiver 12, and having then maintained a relatively small flow of compressed air into annular space 5 by way of throttling means 21, an automatic water level control is achieved which maintains the entire external periphery 11 of band 1 dry except for the relatively small portion represented by band seal 2.

Charging of receiver 12 may be achieved by way of branch duct 18 and non-return check valve 19 or it may be accomplished by means of an entirely separate air compressor. Similarly, instead of controlling the water level at 23 by using gap 9 as the level-controlling outlet, a separate outlet at some higher level may be employed without departing from the spirit of this invention.

I claim:

1. A hydraulic turbine, comprising, a runner and a stationary throat ring forming therebetween an annular space normally filled with water, said runner having an upper portion spaced from an upper portion of the throat ring by a relatively narrow gap constituting a band seal, and a lower portion spaced from a lower portion of the throat ring by a larger gap constituting an outlet to said space, an air port communicating with said annular space between the band seal and the outlet, an air compressor, a vessel for storing air under pressure, communication between said compressor and said vessel, communication between said vessel and said air port, and communication between the air compressor and said air port, and means for controlling said communications whereby said vessel may be charged with compressed air from said compressor, a charge of compressed air may be supplied suddenly from said vessel to said port to purge the annular space of water, and the compressor may be connected with said port to bleed air into the annular space at a pressure effective to maintain the water substantially at the level of the outlet.

2. A hydraulic turbine, comprising, a runner and a stationary throat ring forming therebetween an annular space normally filled with water, said runner having an upper portion spaced from an upper portion of the throat ring by a relatively narrow gap constituting a band seal, and a lower portion spaced from a lower portion of the throat ring by a larger gap constituting an outlet to said space, an air port communicating with said annular space between the band seal and the outlet, a vessel for storing air under pressure, communication between said vessel and said air port, means for controlling said communication whereby a charge of compressed air may be initially supplied suddenly from said vessel to said port to purge the annular space of water, and means connected with said port to bleed air subsequently into the purged annular space at a pressure effective to keep the water out and maintain it substantially at the level of the outlet.

References Cited in the file of this patent

UNITED STATES PATENTS

| | | |
|---|---|---|
| 1,606,887 | Moody | Nov. 16, 1926 |
| 1,823,702 | Ring | Sept. 15, 1931 |
| 1,860,618 | Nagler | May 31, 1932 |
| 1,898,023 | Smyser | Feb. 21, 1933 |
| 2,685,429 | Auyer | Aug. 3, 1954 |

FOREIGN PATENTS

| | | |
|---|---|---|
| 668,434 | Great Britain | Mar. 19, 1952 |
| 182,085 | Austria | May 25, 1955 |
| 929,360 | Germany | June 23, 1955 |
| 155,501 | Sweden | July 31, 1956 |
| 574,981 | Canada | Apr. 28, 1959 |